July 24, 1951  J. W. KARWEIT  2,562,040
DRILLER
Filed June 26, 1943  2 Sheets-Sheet 1
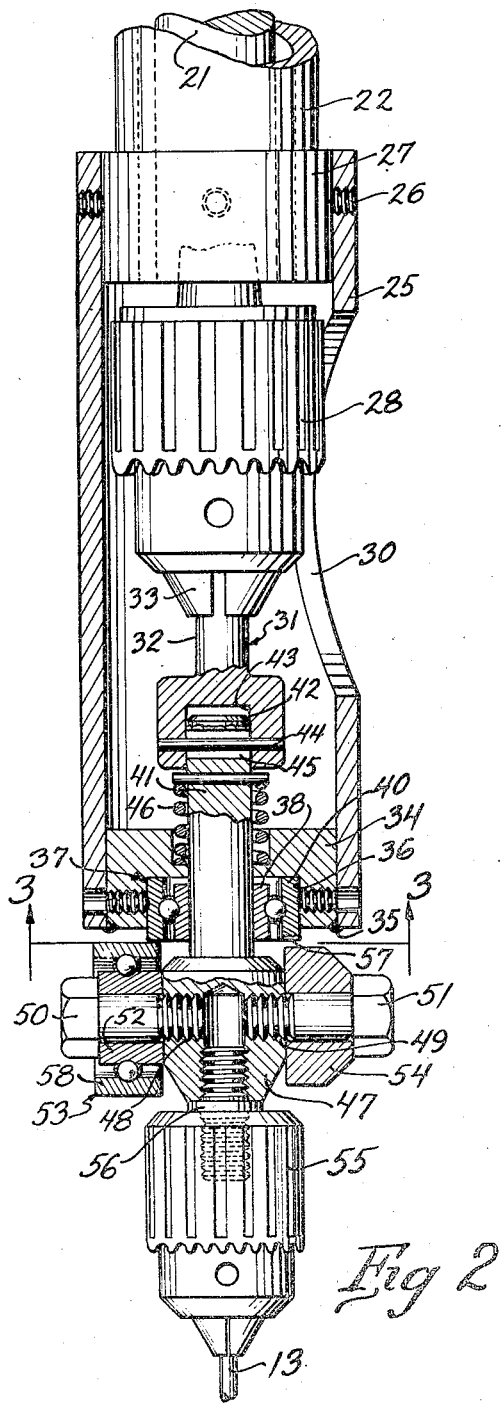
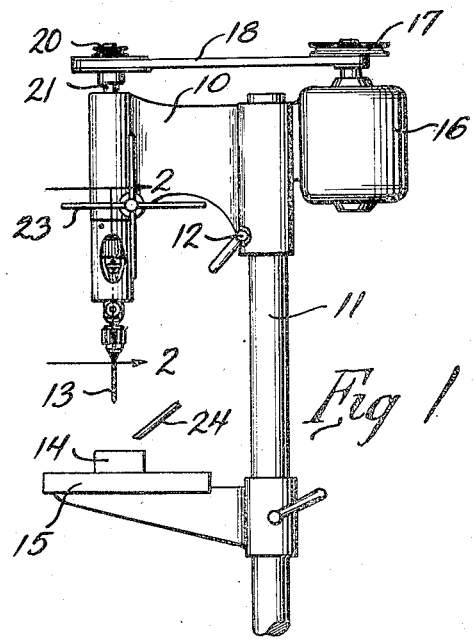
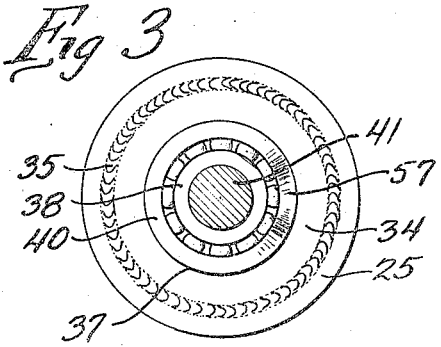
INVENTOR.
John W. Karweit
BY
HIS ATTORNEY July 24, 1951  J. W. KARWEIT  2,562,040
DRILLER Filed June 26, 1943  2 Sheets-Sheet 2

INVENTOR.
John W. Karweit
BY Watson D. Harbaugh
HIS ATTORNEY

Patented July 24, 1951

2,562,040

UNITED STATES PATENT OFFICE 2,562,040

DRILLER

John W. Karweit, Skokie, Ill., assignor, by mesne assignments, to Ex-Cell-O Corporation, Detroit, Mich., a corporation of Michigan Application June 26, 1943, Serial No. 492,373

4 Claims. (Cl. 77—32.3)

The invention relates to power driven tools such as drill presses and the like and more particularly to an apparatus and process of drilling a hole in a machinable material, such as metals, alloys, elastomers and plastics, usually done with a tool commonly known as a twist drill.

Of interest with respect to the present invention are my earlier filed applications, Serial No. 455,417, now Patent Number 2,453,137; 468,399, now Patent Number 2,501,177, and 466,273, now Patent Number 2,453,135, reference to which is hereby made to the extent that they are pertinent for a better understanding of the present invention. Particular reference is made to my earlier filed application, Serial No. 484,612 (now Patent No. 2,453,136) for certain of the structural relationships described in detail, and the explanation of the operation of the invention when used with a twist drill having two cutting edges.

Twist drills which are representative of many types of drills with which the invention will operate are so called because one or more grooves, usually two, are spirally formed in the body of the drill between the point and the shank as by twisting a flat strip of steel or by milling a bar of steel to provide spiral channels for the ready passage of chips and lubricant lengthwise of the drill.

As thus formed, a column of metal stock, generally referred to as the web, is disposed along the axis of rotation of the drill centrally between the channels or flutes. The metal stock extending radially outwardly to the periphery of the drill upon both sides of the web are called the lands. The end of the lands at the point of the drill are ground at an angle to the axis of the drill to provide cutting edges or lips equal in length and equally inclined so that the cutting edges define a surface of revolution comprising a flat cone when the drill is rotated.

The drilling of a hole is accomplished by the cutting edges. These edges, when the drill is rotated and fed into the work piece, simultaneously cut along spiral paths and each edge removes from the work piece at the bottom of the hole a ribbon of material identified as a chip. In conventional drilling, the chip it attached to the work piece ahead of each cutting edge and being short sided on the inner edge curls and rotates in the flutes as well as with the drill as it creeps through the flute from the cutting edge to the mouth of the hole. As a general rule, it is expected and heretofore considered desirable that the chip from each cutting edge be one continuous ribbon from the cutting edge to the mouth of the hole to keep the chip moving.

Considering then, the length, nature and size of the chips and also the fact that the chips are work hardened when formed and that a drill often rotates at a high speed, it will be appreciated how the chips can badly score the wall of the hole and cause friction which generates sufficient heat to rob the lubricant of its coolant character by the time it reaches the cutting edges. Furthermore, as the chips leave the mouth of the hole, they swing wide at great speed, scatter lubricant over the work, the machine, and the operator, and intermittently break and fly tangentially at high velocity forming dangerous projectiles. Often the chips break in the flutes into irregular and uncontrollable forms to jam in the flutes, checking lubrication and augmenting the scoring of the wall of the hole and generally creating a binding which often results in the breaking of the drill.

These and other difficulties familiar to all drill users increase with the depth of the hole and with the stringiness of the material. In fact, it is seldom possible with holes deeper than two or three diameters of the drill to complete the operation without withdrawing the drill point from the hole repeatedly to clear the flutes of the chips jammed in them. This consumes work time of the machine and is a burden upon production involving such expensive special machinery as step drillers, if the feed is to be done automatically.

In accordance with the present invention, the drilling of a machinable material includes repeatedly separating the tool or drill and the material from each other a short distance at brief intervals to sever the chips into small pieces at the cutting edges of the drill, and returning the drill and material immediately to their cutting position.

A further object of the invention is to eliminate the difficulties and hazards experienced with conventional drilling and to speed up production and provide improved wall finish, hole size and alignment regardless of the hole depth of the material involved.

A further object of the invention is to provide an improved drill press construction and arrangement which, while the drill is in operation, produces at the cutting edges of the drill, chips which are of a regulated, substantially uniform size and shape for a given drill size regardless of the material being drilled, and the size of the chips is so regulated as to be small enough to clear the drill flutes easily, yet large enough and curled sufficiently that the chips will not pack in the flutes.

With the ability of the present invention to produce chips of a uniform and small size, regardless of the material being worked, the chip problem is reduced to a common denominator for all materials, thereby standardizing the chip handling for all materials. Furthermore, bushings can be located closer to the work than heretofore possible. In fact, they can be located against the work if desired to serve as a starting means for the drill in lieu of a punch-prick, or the like, and the jigs can be kept clean of chips that would otherwise hamper operations.

A further object of the invention is fulfilled by bathing the cutting edges of a twist drill on both sides of each edge with a coolant once every revolution when cutting such material as high carbon or alloy steels.

Another point of the invention is to provide an improved construction by which a drill press can be converted to embody the invention, yet be adjusted to drill or perform other machine operations according to conventional practices.

These being among the objects of the invention, other and further objects will appear from the drawings, the description relating thereto, and the appended claims.

Referring now to the drawings:

Fig. 1 is a side elevation of a drill press embodying the invention;

Fig. 2 is an enlarged vertical section illustrating one form of the invention as carried by the quill, the drill press, which section is taken upon lines 2—2 in Fig. 1.

Fig. 3 is a section taken upon the lines 3—3 in Fig. 2.

Figure 4:
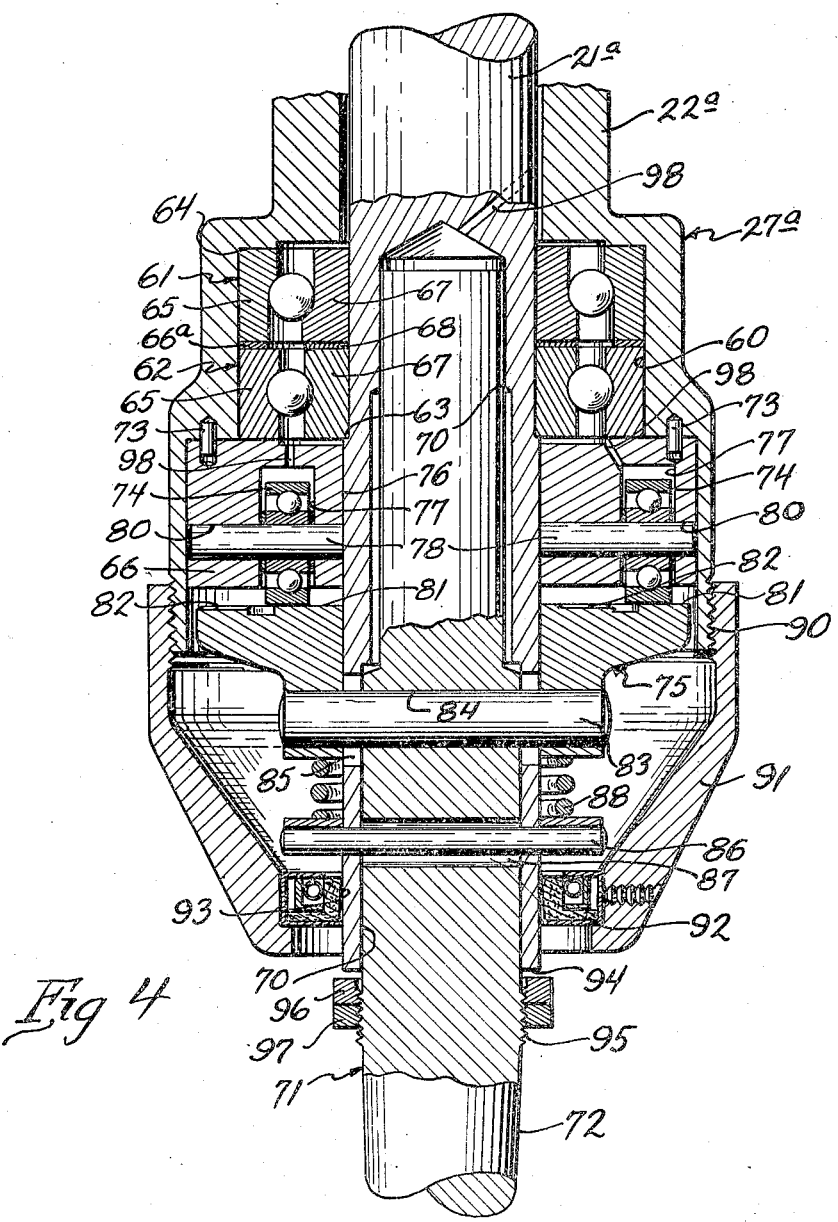
Fig. 4 is a vertical section illustrating another form of the invention which can be embodied in an enlarged portion formed integrally with the quill.

The drill press head 10 as shown in Fig. 1 is slidably mounted upon a standard 11 to be locked at any predetermined height by a split sleeve arrangement 12 so that a drill 13 may be adjustably located vertically with respect to a work piece 14 that is disposed upon a table 15 as held in place by a clamp (not shown).

As viewed in Fig. 1 a motor 16 is mounted at the right of the standard 11 and provided with a step pulley 17 driving a V-belt 18 which in turn drives a second step pulley 20 secured to the upper end of a spindle 21 journalled in the head 10 to the left of the standard 11.

A quill 22 is reciprocably mounted in the head 10 for feed and return movements and controlled for this purpose by a manual throw 23. The word "quill" contemplates any suitable feed traversing element or unit, and an automatic feed can be substituted for the manual throw. A lubricant line 24 is provided if a flow of lubricant is desired.

The embodiment of the invention illustrated in Figs. 1 and 2, comprises a cylindrical housing 25 which is secured by said screws 26 against rotation and axial displacement at its upper end to a head portion 27 upon the lower end of the quill 22. The housing is large enough to slip over a conventional chuck shown at 28 and extends far enough downwardly to support the parts and elements now to be described. Access to the chuck 28 is had through a window 30 in the side of the housing.

The operating parts comprise a rotary drive member 31 having a cylindrical shank 32 thereon received in the jaws 33 of the chuck 28 by which it is solidly held in place and in alignment by the bearings (not shown) which journal the spindle 21. Within the lower ends of the housing a plug member or end wall 34 is secured in place by a suitable means as by welding as indicated at 35 and is hollowed centrally thereof as at 36 to receive a frictionless ball bearing 37 having an inner race 38 and an outer race 40. A driven member 41 is rotatably supported in the inner race 38 of the ball bearing in axial alignment with the drive member 31. The upper end 42 of the driven member 41 is in a cylindrical recess 43 in the bottom end of the drive member to maintain alignment and a suitable member for rotating the one member by the other such as a pin 44 is provided. The pin is carried by the drive member 31 and extends through an elongated diametrical aperture 45 in the upper end of the driven member.

The fit between the inner race 38 and the driven member 41 is sufficiently loose that the driven member is free to oscillate and the driven member is resiliently urged upwardly by a spring and pin assembly 46 to the upper limit permitted to it.

At its lower end beyond the frictionless bearing, the driven member 41 is provided with a head 47 threaded transversely at 48 and 49 to receive bolts 50 and 51, respectively. Bolt 50 carries the inner race 52 of a frictionless ball bearing 53 and the other bolt 51 carries a counterweight 54.

With this arrangement, the frictionless bearing 53 not only rotates about its own axis but is bodily revolved about the axis of the driven member 41 as counterbalanced by the counterweight 54.

At its lower end the head is suitably machined to support a chuck 55. In the particular embodiment shown a nipple 56 is used for that purpose. As shown in Fig. 3, the edge of outer race 40 of the frictionless bearing serves as a path for the bearing 53 or follower and is ground on one side to provide an axial dip or cam 57 that cooperates with the outer race 58 of the frictionless bearing 53 to oscillate the driven member momentarily once each revolution.

As the spindle 21 is rotated the chuck 28 rotates the drive member 31 and thereby the driven member 41 so that once each revolution the outer race 58 of the frictionless bearing 53 engages in the cam 57 upon the outer race of the frictionless bearing 37 to permit the driven member 41 and drill 13 to be raised a limited distance by the compression spring 46, after which the driven member is returned to its former relative position with respect to the housing 25 with the cam and follower carrying the feed pressure of the drill 13.

Thus, while the drill 13 is rotated by the motor 16 and feed traversed by the manual throw 23 to engage the work piece 14 the drill 13 is reciprocated or lifted momentarily once each revolution a predetermined distance which distance may be as little as .006 of an inch at high speeds or .025 of an inch at lower speeds, the distance preferably being slightly more than the feed distance per revolution of the drill, plus deflection in the drill press.

This movement of the drill cuts the chips to a predetermined size and length as fast as the cut progresses and the chips find their way out of the drill flutes quite easily without the conventional need of pulling the drill out of the cut to clear the chips. Either the drill 13 or the work piece 14, or both, can be rotated, it being understood that the oscillation considered herein is occurring once each revolution between the drill and work piece.

Furthermore, depending somewhat upon high drilling speeds, if the drill is the part which is moved axially during the dropping away of the drill and work piece the drill is moved back and forth axially rapidly enough to set up a vibratory action that keeps the chip particles free and loose in the flutes upon the drill. Adequate lubricant reaches the bottom of the cuts easily and excess lubricant can be used to wash away the chips to a suitable depository.

Referring to Fig. 4 a construction is shown wherein the invention is embodied in a mechanism mounted in a cavity 60 provided for that purpose in an enlarged portion or head 27a formed on the lower end of the quill 22a.

In this embodiment the spindle 21a is journalled at its upper end in the quill by a suitable bearing (not shown). At its lower end the spindle is held in place by means of an angular contact frictionless bearing 61 and a radial contact frictionless bearing 62 placed in tandem with each other as received on the lower end of the spindle against a shoulder thereon 63 and in the head against a shoulder 64.

The lower end of the spindle is bored and preferably ground to close tolerances as at 70 to receive for axial reciprocation a male driven member 71 tapered as at 72 at its lower end to receive a drill chuck (not shown).

Below the radial contact bearing 62 a follower cage 66 is mounted in the head as held against rotation by pins 73. In this embodiment it is preferable to provide two followers 74 disposed upon opposite sides of the axis of rotation so that the thrust load carried by the followers 74 and a cam 75 is substantially balanced to prevent any cocking or binding that otherwise might occur between the reciprocating parts under heavy feed pressure.

The thrust load of this feed pressure can be borne two ways against the shoulder 64, namely, through the outer races 65 of the bearings 61 and 62, as spaced by a washer 66a, from a follower cage 66, or through the inner races 67 of the bearings 61 and 62 as spaced by a washer 68 from the shoulder 63.

The follower cage 66 is carved out of rod stock or a die made part and machined to provide a central opening 76 large enough to receive and clear the spindle 21a. Cavities or recesses 77 are provided in the body portion of the cage to receive the frictionless bearing followers 74, the followers being mounted upon radially disposed pins 78 received in bores 80 provided for them through the walls of the cavities. The cavities 77 are spaced from the axis of rotation at different radial distances so that the followers follow different and radially spaced paths.

Cooperating with the followers is the cam 75 centrally apertured to slide easily upon the spindle 21a and provided with two concentric tracks 81 upon its upper face as paths for the followers, one for each of the followers separately. In these tracks are provided at diametrically opposite points dips or cam depressions 82, one for each track so that the cam will be permitted to move upwardly once each revolution when the dips coincide with the followers.

The cam is pinned to the male driven member 71 by means of a pin 83 which is press fitted into the male member as at 84 and received in axially elongated slots 85 upon the spindle so that the pin provides a rotary drive yet does not interfere with the reciprocation of the spindle and male member. Below the cam 75, another pin 86 is provided which is press fitted into the spindle member and received in an axially elongated aperture 87 through the male member so that it does not interfere with the reciprocation of the spindle and the male member. Between the cam 75 and this latter pin 86 is provided a compression spring 88 which backed by the solid engagement of pin 86 with the spindle member, urges the cam 75 and male member 71 upwardly to the upper limit permitted to these two parts by the cooperating positions of the cam and followers.

The lower end of he quill is threaded as at 90 to receive a grease cover 91 thereon having a grease seal 92 which engages the outer surface of the spindle member as at 93.

The spindle member 21a extends all the way through the assembly to terminate in an end shoulder indicated at 94 disposed slightly beyond the lower extremity of the grease cover 91. Below this shoulder 94 on the spindle, the male member is provided preferably with a right hand thread 95 upon which is threaded an adjusting nut 96 and a lock nut 97. With this arrangement two open end wrenches can be readily located upon the hex faces of the nuts 96 and 97 and the action of the male and female members controlled by turning the adjusting nut in either direction. A right hand turn narrows the range of movement, and a left hand turn widens the range of movement permitted to the members under the control of the cam and followers. Furthermore, in event that it is desired that the oscillation be completely removed a complete right hand turn causes the feed pressure to be borne through the angular contact bearing 61 directly from the male member through the adjustment nut to the end shoulder of the spindle by holding the cam at a lowered position to ride free of any engagement with the followers.

Grease passages for the movement of lubricant to the reciprocating parts and the frictionless bearing parts are provided as at 98 to permit the grease supplied to the upper portion of the quill and spindle assembly to have access to the reciprocating parts, the frictionless bearings, the follower and the cams.

The operation of the invention is quite simple from a mechanical viewpoint, depending upon the number of dips provided in the cam transmission depending upon whether one or more reciprocation is desired per revolution of the spindle in event the work piece is rotated also. In the embodiments illustrated only one reciprocation takes place each revolution, but in event the work piece is rotated at the same speed as the drill and in opposite directions, it might be desirable to provide two dips for each revolution of the spindle in order to attain one dip per each relative revolution between the spindle and work piece.

When the invention is placed in operation the cam and follower arrangement will cause the drill periodically to move to the upper limit permitted to it either by the depth of the cam or by the limit imposed on the system by the several adjustments described. This movement cuts the chips to a predetermined size and length. Thereafter, the incline upon the cam immediately returns the drill to its cutting position. For this purpose, the spring should be sufficiently strong to assure that the drill action follows the contour of the cam to the extent that it is permitted to do so in the system, having in mind the weight inertia of the reciprocating parts and the adjustment as to the depth provided by the adjustment described in connection with the adjusting nut 96, which adjustment is made in respect to the expected speed of the spindle. A deeper depth is provided for low speeds and a more shallow depth provided for higher speeds.

In this way the chips are cut into uniform independent particles at the cutting edges as fast as the cut progresses, and the particles find their way out through the drill flutes quite easily without the conventional need of pulling the drill out of the cut repeatedly to clear the chips, such as in step drilling. In addition to this and depending somewhat upon higher drilling speeds, the drill is moved back and forth fast enough to establish a vibratory action that keeps the chip particles free and loose. The chips then clear the flutes readily as urged by the spiral upon the drill.

Moreover, the small chip particles are curled and individually compacted sufficiently tight that their friction with the wall is negligible. In this form the chips before clearing the mouth of the cut permit the lubricant to reach the bottom of the cut to lubricate both sides of the cutting edges of the drill and keep the drill cool, and after the chips clear the mouth of the cut and any bushings present they can easily be washed away to a depository by the lubricant itself, the fixture and work table being kept continuously clean even while the operation is proceeding.

Thus, from the description provided it will be seen how the objects and results of the invention are attained and although in some respects we are not able to account fully for some of the many improved results which are observed, it should be understood that any attempt to analyze the theory which is believed to be responsible for these results is to be construed not as defining a specific or limited mode of operation, but merely as a possible explanation of certain physical and metallurgical phenomena which have been observed.

Consequently, although certain forms and embodiments have been illustrated and described herein, it will be observed that various uses, modifications, and changes may be made without departing from the spirit and substance of the invention, the scope of which is commensurate with the appended claims.

What is claimed is:

1. In combination, a non-rotary axially translatable quill having a spindle journalled therein for translation therewith, a chuck detachably secured to one end of said spindle, an elongated cylindrical housing secured at one end to said quill and formed in one side with a window opening for affording access to said chuck, a drive shaft removably secured in said chuck in axial relation therewith, a driven shaft journalled in and extending axially from said housing and adapted to support a drill for drilling a machinable material, said driven shaft being connected to said drive shaft for rotation therewith and axial reciprocation relative thereto, a cam member, a cam follower member, one of said members being secured in fixed position to said housing, means for supporting the other of said members from said driven shaft for coaction with said one member, and means for maintaining said members in cooperative engagement, said cam member having a configuration operative in the rotation of said driven shaft to impart to said driven shaft a momentary retractive reciprocation within a minor portion of a revolution once each relative revolution of said cam and cam follower members and to sustain said driven member in feed position over the remaining portion of each revolution.

2. A chuck adapter for use with a non-rotatable and axially translatable quill having a spindle journalled therein with a chuck on one end of said spindle, said adapter comprising an elongated housing adapted to be removably secured at one end to said quill, a drive shaft within said housing and adapted to be secured in said chuck for rotation therewith, a driven shaft journalled in and extending from the other end of said housing in coaxial relation with said drive shaft and keyed thereto for rotation therewith and axial reciprocation relative thereto, a cam member encircling said driven shaft and having an annular cam track comprising a dwell area over the major portion of its circumference and a dip in the remaining portion of said circumference, a cam follower member, one of said members being secured in fixed position to said housing, means for supporting the other of said members from said driven shaft for rotation therewith and for engagement with said cam track, and resilient means acting to maintain said members in cooperative relation, whereby said members are operative to impart to said driven shaft a momentary retractive reciprocation within a minor portion of a revolution once each relative revolution of said cam and cam follower members, and to sustain said driven shaft in feed position over the remaining portion of each revolution.

3. In combination with a non-rotatable and axially translatable quill journalling a rotary spindle, an elongated housing adapted to be secured at one end to said quill, a drive shaft adapted to be secured in coaxial relation to said spindle for rotation therewith, an end wall in the other end of said housing and having a central aperture opening therethrough, a driven shaft journalled in and extending through said end wall and keyed to said drive shaft for rotation therewith and axial reciprocation relative thereto, a frictionless bearing for supporting said driven shaft and having an outer annular race member fixed in the outer face of said wall, the outer end of said race member defining a cam track having a dwell and a dip, a radially supported follower member on said driven shaft disposed for engagement with said cam track, resilient means for maintaining said follower member against said cam track, and means for supporting a drill upon said driven shaft.

4. In combination with a non-rotatable and axially translatable quill journalling a rotary spindle, an elongated housing adapted to be secured at one end to said quill, a drive shaft adapted to be secured in coaxial relation to said spindle for rotation therewith, an end wall in the other end of said housing and having a central aperture opening therethrough, a driven shaft journalled in and extending through said end wall and keyed to said drive shaft for rotation therewith and axial reciprocation relative thereto, a frictionless bearing for supporting said driven shaft and having an outer annular race member fixed in the outer face of said wall, the outer end of said race member defining a cam track having a dwell and a dip, a frictionless radial contact ball bearing carried by said driven shaft externally of said housing and riding on said cam track, a counterweight carried by said driven shaft in diametrically opposed relation to said ball bearing, resilient means for maintaining said ball bearing in contact with said cam track, and means for supporting a drill upon said driven shaft.

JOHN W. KARWEIT.

REFERENCES CITED

The following references are of record in the file of this patent:

UNITED STATES PATENTS

| Number | Name | Date |
| --- | --- | --- |
| 1,196,656 | Bugbee | Aug. 29, 1916 |
| 1,884,396 | Uecker | Oct. 25, 1932 |
| 2,105,762 | Zimmerman | Jan. 18, 1938 |
| 2,328,542 | Bates | Sept. 7, 1943 |

FOREIGN PATENTS

| Number | Country | Date |
| --- | --- | --- |
| 510,482 | Great Britain | Aug. 2, 1939 |